United States Patent [19]

Clear et al.

[11] 4,420,295

[45] Dec. 13, 1983

[54] APPARATUS FOR MANUFACTURING CEMENTITIOUS REINFORCED PANELS

[76] Inventors: Theodore E. Clear, 903 Harrison Ave.; Paul E. Dinkel, 645 Hamilton-New London Rd., both of Hamilton, Ohio 45013

[21] Appl. No.: 265,898

[22] Filed: May 21, 1981

Related U.S. Application Data

[62] Division of Ser. No. 78,932, Sep. 26, 1979, Pat. No. 4,281,952, which is a division of Ser. No. 887,324, Mar. 16, 1978, Pat. No. 4,203,788.

[51] Int. Cl.³ .......................... B29C 17/14; B29D 3/02
[52] U.S. Cl. ..................... 425/92; 118/126; 118/304; 118/419; 156/346; 156/510; 425/93; 425/106; 425/115; 425/122; 425/308
[58] Field of Search ............ 425/90, 92, 93, 96, 102, 106, 115, 122, 289, 308, 404; 118/126, 304, 325, 419; 156/346–348, 510

[56] References Cited

U.S. PATENT DOCUMENTS

| | | | |
|---|---|---|---|
| 654,024 | 7/1900 | Ryan | 156/347 |
| 1,353,510 | 9/1920 | Baumgartl | 156/42 |
| 1,353,512 | 9/1920 | Baumgartl | 425/102 |
| 1,439,954 | 12/1922 | Emerson | 428/140 |
| 1,749,436 | 3/1930 | Meier | 156/346 |
| 1,859,853 | 5/1932 | Thomson | 156/346 |
| 1,859,878 | 5/1932 | Lockwood | 264/256 |
| 1,862,318 | 6/1932 | Ruby | 425/81.1 |
| 1,908,658 | 5/1933 | Dean | 425/369 |
| 2,200,155 | 5/1940 | Camp et al. | 425/110 |
| 2,307,332 | 1/1943 | Parsons | 428/140 |
| 2,371,353 | 3/1945 | Parsons | 425/115 |
| 2,446,782 | 8/1948 | Otis et al. | 425/115 |
| 2,565,941 | 8/1951 | Barnard | 264/258 |
| 2,631,381 | 3/1953 | Burrows | 264/261 |
| 2,712,169 | 7/1955 | Buttress | 425/298 |
| 2,741,955 | 4/1956 | Magnani | 264/255 |
| 2,786,254 | 3/1957 | Olson | 264/71 |
| 2,850,890 | 9/1958 | Rubenstein | 428/294 |
| 2,940,505 | 6/1960 | Brothers | 156/346 |
| 3,027,294 | 3/1962 | Bettoli et al. | 264/112 |
| 3,284,980 | 11/1966 | Dinkel | 52/367 |
| 3,303,245 | 2/1967 | Trudeau | 264/70 |
| 3,306,609 | 2/1967 | Beuck | 271/192 |
| 3,423,492 | 1/1969 | Jonell et al. | 425/63 |
| 3,509,010 | 4/1970 | Metzger | 428/213 |
| 3,565,650 | 2/1971 | Cordon | 264/122 |
| 3,608,003 | 9/1971 | Klaue et al. | 264/42 |
| 3,832,250 | 8/1974 | Pearson | 156/39 |
| 3,901,634 | 8/1975 | Webb et al. | 425/115 |
| 3,908,062 | 9/1975 | Roberts | 428/282 |
| 3,972,972 | 8/1976 | Yano et al. | 264/117 |
| 4,094,944 | 6/1978 | Paetz | 425/289 |

Primary Examiner—Willard E. Hoag
Attorney, Agent, or Firm—Wood, Herron & Evans

[57] ABSTRACT

Reinforced facings, including reinforcing webs entrained in hydraulic cement via a slurry bath, adhere to a nailable lightweight aggregate cementitious core to form a panel web. The reinforced web is formed on abutting conveyed carrier sheets, and the web is transversely cut, between the sheets, while moving or when stopped, in response to sensing of the sheets. The cut panels, on respective sheets are stacked for curing without damaging the panel edges and in a manner to minimize panel flex. Slurry bath, facing applicators, and cutter and stacking apparatus are included.

4 Claims, 14 Drawing Figures

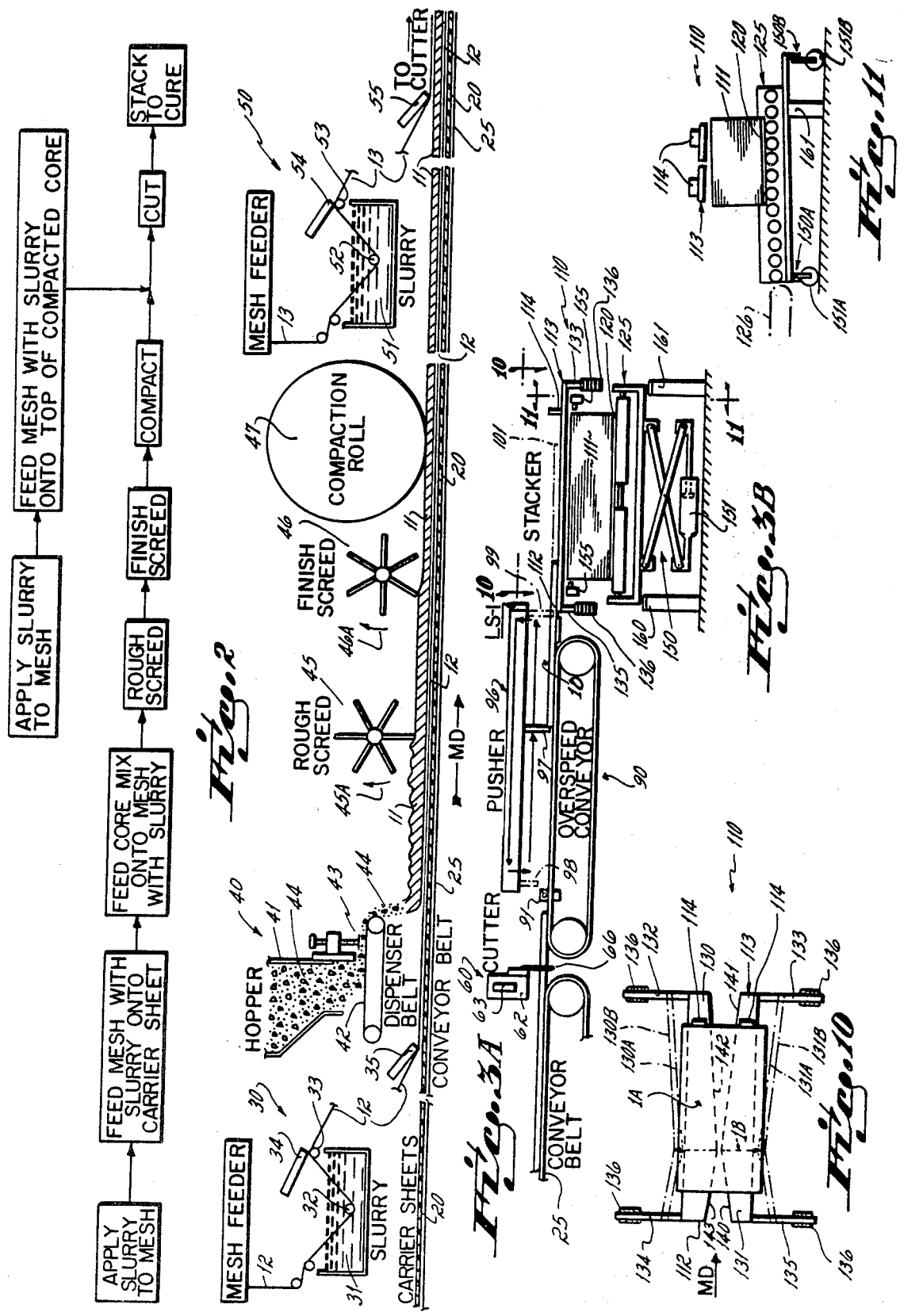

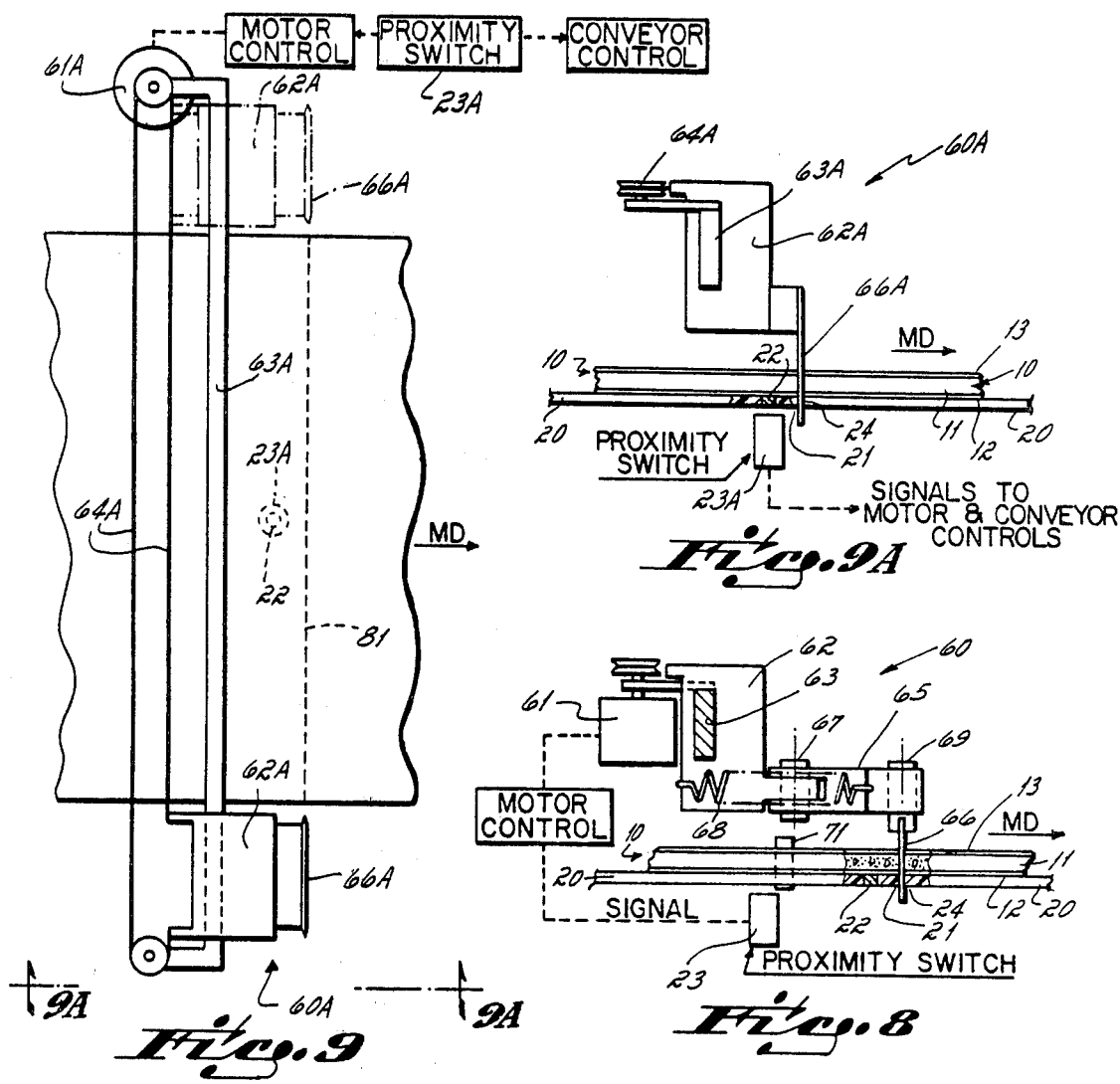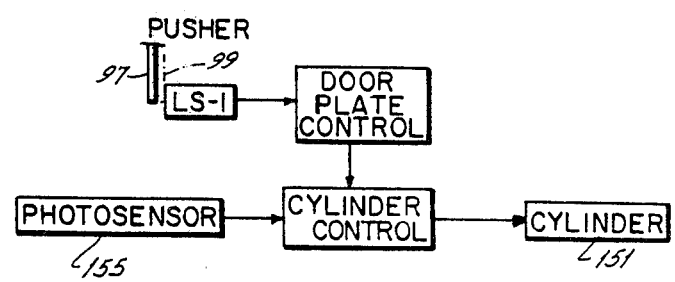

APPARATUS FOR MANUFACTURING CEMENTITIOUS REINFORCED PANELS

This is a continuation, of application Ser. No. 78,932, filed Sept. 26, 1979 and now U.S. Pat. No. 4,281,952, issued Aug. 4, 1981, which is a divisional of application Ser. No. 887,324 filed Mar. 16, 1978, and now U.S. Pat. No. 4,203,788.

This invention relates to methods and apparatus for manufacturing construction panels and more particularly, reinforced cementitious panels of the type generally described in U.S. Pat. No. 3,284,980. These panels typically include a cementitious aggregate core layer faced with reinforcing mesh adhered thereto with hydraulic cement. In many cases, the core is so substantially drier than the cement on the mesh, that it may in fact be crumbly in texture.

Reinforced cementitious panels of the type noted are extremely useful in the construction industry, yet heretofore no entirely suitable methods and apparatus for economically manufacturing commercially useful panels have been known. While the patent noted describes one way to manufacture the panels by the use of individual forms, the increased demands for many panels can only be economically satisifed by production methods having a greater output capacity.

Moreover, prior known methods of panel manufacture have been attended by problems in the adherence of the facings to the core layer and in the cutting, and stacking procedures. For example, separation of the facing from the core is highly undesirable since it destroys the integrity of the panel, and its desired strength characteristics. Too little hydraulic cement on the core side of the reinforcing mesh is one potential cause for such separation, particularly when the difficulty of bonding the facing to any aggregate crumbly core is considered.

Another potential cause has to do with movement of the panel prior to the time it is cured. Flexing of the panel can cause the layers to move with respect to each other, and thus to separate. Such flexing can occur in the stacking operation where the panels are stacked for curing.

Another exemplary difficulty is encountered in maintaining clean panel edges. Wide blade guillotine type cutting techniques have not been found suitable as they tend to produce ragged or inclined edges. Also, the edges can be disturbed by handling or movement of the panel prior to curing.

Accordingly, the present invention contemplates novel methods and apparatus for economically manufacturing and producing useful, integral reinforced cementitious panels having a lightweight aggregate core and reinforced cementitious facings. In a preferred embodiment of the invention, such a panel is manufactured by the steps of running a continuous web of fiberglass reinforcing mesh through a cementitious slurry bath to fill voids in, and accumulate on, both sides of, the mesh; doctoring excess slurry therefrom; laying the wet mesh on a plurality of thin moving abutted carrier sheets; depositing a lightweight, low-moisture content aggregate core material on the mesh; compacting the aggregate core material; running a second continuous web of fiberglass mesh through a cementitious slurry bath; doctoring excess slurry therefrom; laying the second wet mesh on the compacted aggregate core material to form a panel web; cutting the panel web transversely thereacross and between the carrier sheets to form separate panels; and thereafter stacking the cut panels on one another for curing in a manner to minimize flexing the panel and disturbance of its edges.

An associated aspect of the invention includes dragging each of the fiberglass webs as they are placed respectively on the carrier sheets and on the core material in order to drive slurry through the mesh, the slurry operatively bonding the meshes to the relatively dry and crumbly or no slump lightweight core.

A further aspect of the invention resides in forming a continuous reinforced cementitious panel on a plurality of carrier sheets, and in transversely cutting the continuous panel web into preselected panel sizes corresponding to the length of the carrier sheets. In a preferred embodiment, the carrier sheets abut end to end on a belt conveyor. Each carrier sheet is sensed to actuate a cutter drive operable to draw a knife across the panel web, transversely thereto, in order to cut individual panels from the panel web between the carrier sheets. More particularly, each carrier sheet is provided with a metallic rivet near the front edge thereof. A metallic proximity sensing apparatus under the conveyor belt senses the rivet and actuates a cutter across the panel web between the abutting carrier sheets. The cutter is mounted on a carriage driven swing arm, and moves with a component of motion in the machine direction, while at the same time cutting transversely across the moving panel web, all to permit cutting during continuous movement of the panel web. The cutoff panel is accelerated away from the following panel web by an overspeed belt to a panel stacking apparatus for curing and storage. In an alternate method, a cutter is mounted directly to the carriage and cuts panels at a time when the carrier sheets are stopped, having leading and trailing edges indexed to the cutter position via the sensing apparatus.

After cutting, and in another aspect of the invention, the panels are introduced to a stacker table having drop plates which slide to the sides and drop the carrier sheet and cementitious panel thereon a minimal distance onto a stack of previous panels. The stack is supported by an indexable support which drops a distance equal to a panel thickness upon each stacker operation. The cementitious panels are cured in these stacks and are thereafter ready for storage or use.

Where the drop plates withdraw from beneath the panels, the panels, and carrier sheets flex and sag in the middle and this sagging can cause separation of the panel layers. In order to minimize panel flex during dropping, and to preserve edge integrity, the drop plates are preferably tapered so that upon their withdrawal, support is first removed from the panel corners, then from the panel center. This minimizes overall flex and reduces or eliminates layer separation. Thus the drop plate structure interacts with the minimal drop distance provided by the indexable stack to significantly reduce panel flex and layer separation.

Accordingly, the invention provides apparatus and methods whereby a cementitious slurry wetted reinforcing mesh is operably adhered to both sides of a relatively lightweight, low moisture, cementitious aggregate core and the formed web is thereafter cut to individual panels which are stacked for curing. The invention provides an economical and high output capacity manufacturing process, all without disturbing the panel's edge or layer bond integrity.

These and other advantages will become readily apparent from the following detailed description of a preferred embodiment of the invention and from the drawings in which:

FIG. 2 is a flow chart illustrating methods according to the invention;

FIGS. 3A and 3B are elevational diagrammatic views of panel manufacturing apparatus according to the invention, FIG. 3B differing somewhat in scale from FIG. 3A for clarity;

FIG. 8 is a cross sectional view of the cutter taken along lines 8—8 of FIG. 6;

FIG. 9 is a top view of an alternate panel web cutter according to the invention;

FIG. 9A is an end view of the alternate panel web cutter taken along lines 9A—9A of FIG. 9;

FIG. 10 is a plan view of a stacking apparatus according to the invention, taken along lines 10—10 of FIG. 3B;

FIG. 11 is an end view of the stacking apparatus taken along lines 11—11 of FIG. 3B; and FIG. 12 is a control flowchart illustrating operation of the stacker apparatus.

PANEL FORMING

Figure 1:
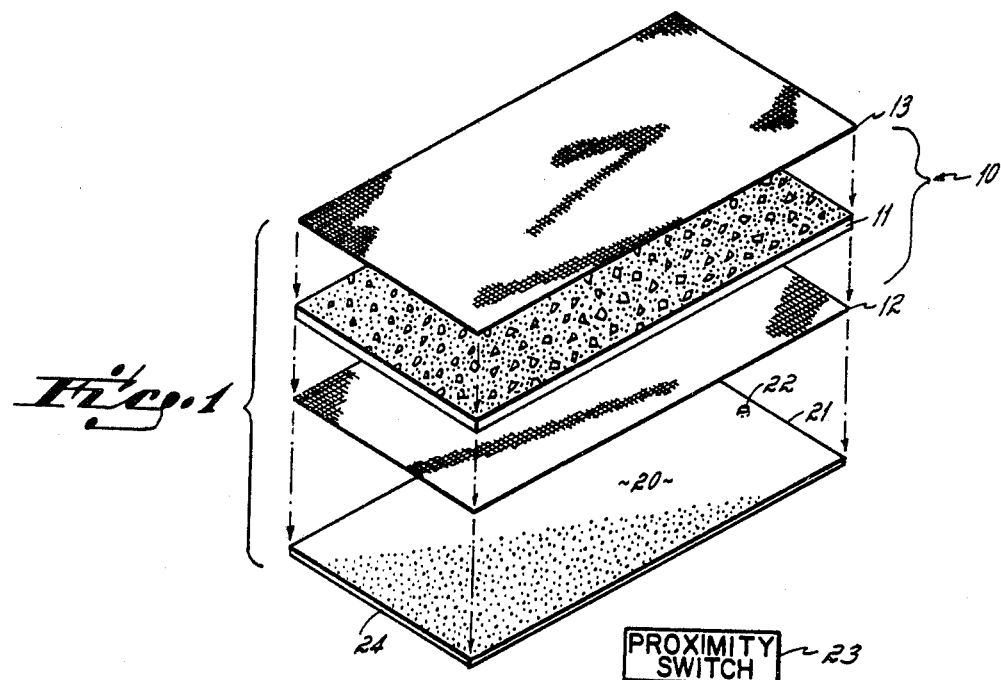
FIG. 1 is an exploded view of a panel and carrier sheet according to the invention.

Turning now to the drawings, FIG. 1 is an illustrative exploded view of a preferred panel manufactured by the methods and apparatus of the present invention. The details of the panel are best described in detail in U.S. Pat. No. 3,284,980 to P. E. Dinkel entitled "Hydraulic Cement Panel with Low Density Core and Fiber Reinforced High Density Surface Layers," which patent is expressly incorporated herein by reference. As shown in FIG. 1, however, the panel 10 to which this disclosure is directed generally constitutes a reinforced nailable cementitious structural panel comprising a core layer 11, a facing including a reinforcing element 12 on one major side of the core layer 11 and a reinforced facing 13 including a reinforcing element on another major side of the core 11.

The core 11 constitutes a lightweight concrete made up of a lightweight aggregate and hydraulic cement, the relationship of aggregate to cement being such that the core layer is relatively dry and crumbly, or with a no slump characteristic, as compared to the reinforced facing layers, as will be described. For example, the core layer contains a mix of about three or four parts of aggregate by volume to each part of hydraulic cement, thus providing a nailable layer. Further details of the core are disclosed in the cited U.S. Pat. No. 3,284,980.

The reinforced facings preferably constitute fiber mesh-like webs 12 and 13, each entrained, according to the invention, in hydraulic cement. As will be described, the hydraulic cement is applied to the mesh reinforcing elements 12 and 13 such that the hydraulic cement substantially fills the interstices in the fiber layer and covers the outer faces of the layer. The further details of the reinforcing elements are also found in the cited U.S. Pat. No. 3,284,980. Each of the reinforcing elements are relatively thin i.e. on the order of, for example, 0.125 inch thick, and the entire cementitious panel 10 including core layer 11 and facings preferably constitute a structural panel from, for example, about one-quarter inch thickness to and beyond, for example, two inches in thickness, depending upon desired end use. Of course, thinner reinforcing elements are utilized for thinner panels, as necessary.

While the cited U.S. patent demonstrates one method of manufacturing panels, the production of a substantial number of panels requires a manufacturing process having a high capacity output while at the same time producing a useful, integral panel having layers which are thoroughly bonded to each other and having relatively straight nonragged and undisturbed edges. According to the cited U.S. patent, the panels are manufactured by the application of various layers to each other in distinct separate molds, and subsequent curing.

Prior to curing, flexing of the panel has the tendency to cause the various layers of the panel to move with respect to each other and to separate, thereby destroying the integrity of the panel and reducing the desired strength characteristics of the panel. Thus, it is highly desirable in the manufacture of separate panels to avoid any flexing of the panel, thereby to minimize layer separation and to enhance the integrity of the panel. In addition, it is highly desirable to provide a panel with smooth parallel edges, both for aesthetic reasons and for resistance of the panel to any elements to which it will be exposed.

It has been known to manufacture cured concrete in elongated cured form, and thereafter to cut it into separate panels. The present invention, as will now be described, produces separate cut and stacked reinforced cementitious panels all prior to curing and with minimal panel flex during the forming operation and with uniform nonragged edges, all to provide an integral useful panel in a high output capacity manufacturing process. To these ends, and as shown in FIG. 1, panel carrier sheets 20 are provided for each to-be-formed panel 10. The carrier sheets 20, according to the invention, are approximately one-eighth inch thick and are preferably made from a plastic material such as polyethylene. Each carrier sheet 20 includes, proximate an end 21 thereof, a metallic element, such as a rivet 22, for sheet sensing purposes, as will be hereinafter described. Each carrier sheet is normally flat, having no raised ends or sides, and is somewhat flexible. As heretofore stated, the bonding of the reinforcing elements 12 and 13 to the core layer 11 of the panel is extremely important to the integrity of the panel and to its strength characteristics. One aspect of the invention accordingly provides for the bonding of a reinforcing element to a crumbly, relatively dry, cementitious aggregate core layer simply by virtue of the entraining of the reinforcing element in a hydraulic cement whereby the hydraulic cement serves to bond the reinforcing element to the core. In order to provide for maximum bonding of the reinforcing element to the core, the invention contemplates a method for entraining the reinforcing elements within the hydraulic cement such that the cement tends to fill the voids of the mesh-like reinforcing element, and to accumulate on the outer surfaces of the element, thereby to bond the element to the core and to form a desired outer facing surface. At least the first reinforcing element tends to float in the slurry during panel formation.

The flow chart of FIG. 2 depicts the method steps by which the panel is formed according to the invention. FIGS. 3A and 3B diagrammatically illustrate the features of a panel manufacturing process, which correspond to the steps illustrated in FIG. 2. Considering both FIG. 2 and FIGS. 3A and 3B, it will be seen that a continuous web of a mesh-like reinforcing element is fed through a first trough or slurry bath 30 wherein the slurry material 31 therein constitutes hydraulic cement mixture as described in U.S. Pat. No. 3,284,980. As shown in FIG. 3A, the elongated reinforcing element 12 is drawn through the slurry bath 30 by virtue of a roller 32 such that the hydraulic cement 31 is applied to both sides of the elongated reinforcing web 12. Thereafter, the reinforcing web is pulled from the bath 30 around roller 33 and any excessive slurry is doctored from the web 12 by virtue of an adjustable doctoring blade or metering apparatus 34, which can be adjusted to control the amount of slurry actually applied to the web 12.

From the metering apparatus 34, the web 12 then travels downwardly to a point where it is layed onto a plurality of carrier sheets 20. Each of the carrier sheets is supported and conveyed by a conveyor belt 25 with the sheets in abutting relationship so that a forward end of each carrier sheet preferably contacts the trailing end of a preceding carrier sheet. While it may be possible to lay the slurried web 12 onto carrier sheets which are spaced apart, it is preferable to lay the carrier sheets end to end in abutting relationship as described in order to maintain uniformity of the panel face. The carrier sheets can be placed on the conveyor belt upstream of the slurry bath 30 by any appropriate means, which do not constitute part of this invention.

Continuing now with the description of the method by which the panel 10 is formed, the slurried web 12 is layed down on the carrier sheets by virtue of a drag bar 35, which is positioned above the web and which drags against its upper surface, thereby serving to urge hydraulic cement on the upper surface of the web into the interstices of the web and through the web. It should be appreciated, however, that the drag bar does not remove or scrape from the mesh all of the hydraulic cement, but rather leaves a quantity of cement on the upper surface of the web.

Proceeding from the drag bar 35, the conveyed carrier sheets and web move beneath the core mix feeder 40. The core mix feeder 40 constitutes a hopper 41 terminating over a belt conveyor 42, which transfers the aggregate cementitious core mix through an adjustable metering gate 43 for controlling the amount of mix layed onto the slurried mesh 12.

The core mix 44 is thus fed from the hopper 41 onto the belt 42, and thereafter through the gate 43 onto the slurried mesh web 12 as shown in FIG. 3A.

At least the upper layer of the core mix between the core mix feeder 40 and the rough screed 45 is not uniform. The rough screed 45 counter rotates in the direction of arrow 45A to smooth out the upper surface of the core layer 11. Thereafter, a finished screed 46, which counter rotates in a direction of arrow 46A, serves to reduce the thickness of the core layer 11, and to further smooth the upper surface thereof. Thereafter, the conveyor belt moves the abutting carrier sheets 20, the slurried mesh 12 and the core layer 11 into a compaction station formed by compaction roll 47, which serves to compact the core 11 against the slurried mesh 12. This enhances the bond of the slurried mesh to the relatively crumbly core.

Thereafter, an elongated reinforcing mesh-like element in the form of a continuous web 13, is fed through a second slurry bath or trough 50 containing a slurry 51, also of the hydraulic cement-mixture previously described. The web 13 is drawn through the bath 50 by virtue of the roller 52, and thereafter past roller 53 and a second adjustable doctor blade or metering apparatus 54 for controlling the amount of slurry applied to the web 13. Both metering apparatus 34 and 54, and the first and second slurry baths can be of any suitable form constituting, with their respective backup rollers and adjustable gate, a slurry to mesh applicator for passage of the mesh with an appropriate amount of slurry thereon. The slurry metering can be accomplished in any suitable fashion.

From the metering apparatus 54, the web 13 is conveyed onto the upper surface of the compacted core layer 11 by virtue of a second drag bar 55 at which point the mesh is layed down on top of the core layer. The drag bar 55 is operable to urge the hydraulic cement on the mesh element 13 into the interstices thereof and through the mesh, so that a sufficient amount of hydraulic cement resides on lower surface of the mesh element 13 and thereby contacts the surface of the core layer 11 for bonding the element 13 thereto. Subsequent stacking for curving serves to enhance the bond.

From the drag bar, the continuous panel web, including a slurried lower mesh element 12, a core layer 11 and a slurried upper mesh element 13, is conveyed into a cutter station as depicted in FIG. 3B. This illustration, for clarity, shows the formed panel web in lesser detail than in FIG. 3A.

The cutter station includes a cutter 60 for moving transversely across the formed panel web and cutting the web between adjacent and abutting carrier sheets. The details of the cutter will be hereinafter described.

From the cutter 60, the now individual panel 10, and its respective carrier sheet 20, is conveyed onto an overspeed conveyor 90, operating at a speed in excess of that of conveyor 25, to separate a cut panel and carrier sheet from the integral continuous formed panel web upstream of the cutter 60. Once the now cut panel and associated carrier sheet is moved onto the overspeed conveyor 90, it is sensed, as will be described, and is pushed from the overspeed conveyor, via pusher 96, onto the stacking apparatus 110. Stacker 110 serves to form a stack 111 of assemblies, each of which comprise a carrier sheet with a reinforced panel 10 thereon. When a full stack 111 is formed, the stack is conveyed away from the stacking apparatus 110 for further curing and storing. Once cured, the panels are ready for use in many construction and remodeling applications. As will be appreciated, various panel face texturizing means could be provided to texturize the hydraulic cement on the panel face to any desired design.

Returning now to a more detailed description of the cutting apparatus, FIGS. 4 through 7 depict a preferred cutting apparatus, which is operable to cut the continuous panel web transversely and between the carrier sheets during movement of the panel web in the machine direction, which is indicated by the arrows MD in the various drawings. The combination of the transverse cutting apparatus and its operation, when taken together with forming the continuous panel web on abutting carrier sheets, constitutes a unique means by which separate uncured panels can be cut to provide uniform panel edges without distortion and raggedness of that edge. Furthermore, it should be noted that the ability to cut separate panels from the continuously formed panel web, all while the web continues to move significantly increases the output capacity of the manufacturing process.

THE PANEL CUTTER

Turning now to the details of the cutter operation, and first to FIG. 8, it will be noted that the rivet 22 has been located in the forward or leading edge 21 of a respective carrier sheet as shown in FIG. 8. The cutter, as will be described, is actuated into a cutting traverse of the panel web upon an appropriate sensing of the rivet 22. This sensing can be accomplished, for example, by way of a metallic proximity switch 23, such as, for example, a proximity switch manufactured by the Allen-Bradley Company under its Bulletin No. 870. Upon sensing the proximity of the rivet 22 at the position as shown in FIG. 8, the proximity switch signals a cutter drive motor 61 to operate the cutter and thereby cut the panel between the abutting carrier sheets.

Figures 4, 5, 6, 7:
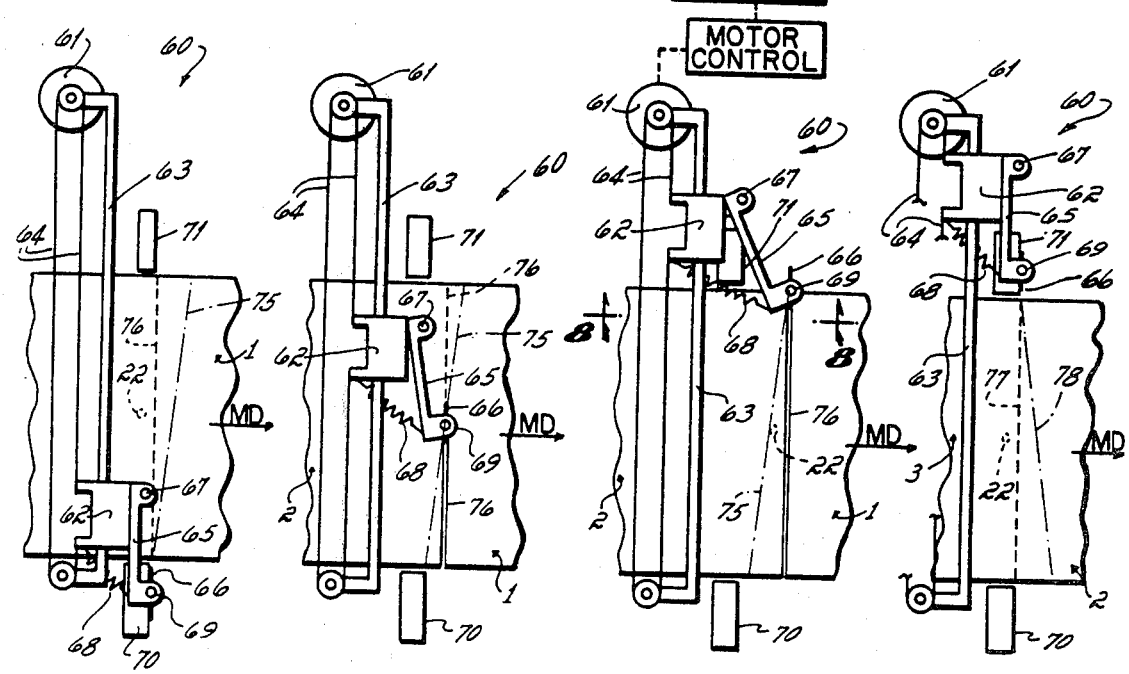
FIGS. 4–7 are top view of a preferred panel web cutter according to the invention.

For the purposes of description of the cutter operation in FIGS. 4 through 7, three different panels or panel webs 1, 2, and 3, as the case may be, will be considered. As shown in FIG. 4, for example, panel web portion 1 is a portion of a continuously formed panel web, no cuts having yet been made. In FIG. 5, a cut has partially been made to separate the to-be-formed individual panel 1 and its associated carrier sheet from the leading edge of the following continuous panel web designated by the numeral 2. In FIG. 6, the cut is substantially completed so that the panel 1 now constitutes a separate cut panel similar to the cementitious panel 10 of FIG. 1, while the continuous panel web following is designated by the numeral 2. The web 2 has a leading edge defining by leading edge 21 of a carrier sheet and separate panel 1 has a traiing edge, coextensive with the trailing edge 24 of the carrier sheet on which the panel 1 is carried.

In FIG. 7 the continuous panel web, designated by the numeral 2, has now moved forwardly sufficiently in the machine direction so that a following carrier sheet, beneath the web portion including to-be-formed panel 3, is now moved into the cutter station. Hereafter, the cutter apparatus will be actuated in a direction opposite to its first cutting traverse to cut panel 2 from the following panel web 3, between the respective carrier sheets as depicted in FIG. 7.

Turning now to the details of the cutter apparatus, the cutter 60 comprises a cutter drive motor 61 mounted to drive a carriage 62 transversely across the panel web on a track 63. Track 63 can be frame mounted (not shown) across the web in any suitable fashion.

The motor 61 is suitably mounted on the track 63, or the supporting frame thereof, and is connected to the translatable carriage 62 via a cable 64, having ends connected to opposite sides of the carriage 62 as shown in the drawings. The motor 61 is reversible so that it alternately drives cable 64 in one direction, and then in the other, in response to actuation by an appropriate motor control, which is activated by the actuation of proximity switch 23 upon sensing the rivet 22.

The preferred cutter also includes a swing arm 65 on which is mounted a cutter blade 66. Swing arm 65 is pivoted at 67 to the carriage 62 and is urged by spring 68 into the positions shown in FIGS. 4 and 7. It should also be noted that the cutter blade 66, which is approximately two inches wide and double edged, is pivoted at 69 to the swing arm 65. When the carriage is in its extreme positions, as shown in FIG. 4 and FIG. 7, the spring 68 is operable to rotate the swing arm 65 about the pivot 67 in a clockwise direction and to thereby urge the pivoted cutter blade 66 against the respective stops 70 and 71, thereby to position the pivoted cutter blade 66 at a 90 degree angle with respect to the machine direction and the longitudinal axis of the panel web. Thus the cutter blade 66 is positioned parallel to the leading and trailing edges 21 and 24 of the carrier sheet 20, and perpendicular to the elongated edges of the panel. Thus when the rivet 22 is sensed at the cutter station, the motor 61 is actuated to drive the carriage 62 across the web, thereby the cutter blade 66 enters the panel web between the leading and trailing edges of adjacent and abuting carrier sheets, and cuts across the panel web to separate, for example, panel 1 from panel web portion 2, as shown in FIGS. 4, 5 and 6. Since the panels are constantly moving in the machine direction during the cutting operation, it will be seen from FIGS. 4 through 6 that the pivot axis of the cutter blade actually traverses a diagonal path 75, as shown in the figures, while the actual cut is made between the carrier sheets on a line perpendicular to the edges of the panel web, the cut line being shown in dotted form at numeral 76.

Once the panel 1 has been cut from the panel web portion 2, the carriage 62 moves to the extreme position as shown in FIG. 7, where it resides until a succeeding rivet 22 is sensed in the next carrier sheet coming into the cutting station. At this point in time, the trailing end of the to-be-formed panel 2 has moved to the cutting area and the leading edge 21 of the carrier sheet under the continuous panel web portion 3 immediately follows.

When the rivet 22 is sensed, the motor control is signaled via switch 23 to energize the motor to drive the carriage 62 back across the panel web in an opposite direction, from its traversing movement in FIGS. 4 through 6, to cut along the intended cut line 77 and thereby separate the to-be-formed separate panel 2 from the continuous panel web portion 3. The cut, of course, is made between the trailing edge 24 of the carrier sheet under panel 2 and the leading edge of the carrier sheet under the panel web portion 3. As shown in FIG. 7, since the panel and panel web are moving in the machine direction during operation of the cutter 60, the pivot point 69 actually traverses a diagonal line indicated at 78 in FIG. 7, yet a straight cut is made across the panel web by virtue of the cutter blade 66 being guided between the trailing edge 24 of the carrier sheet for the panel 2 and the leading edge 21 of the carrier sheet under the panel web portion 3.

Of course, it will be appreciated that the spacing between the proximity switch 23 and the actual cutter position, in its stopped location, is important. In this regard, it should be noted that the proximity switch 23, and the motor control are set up by any suitable fashion, well known in the art, to control the motor 61 to drive the cutter blade 66 into the panel web at that point in time, in relation to sensing of the rivet 22, at which the cutter blade 66 is aligned with the leading and trailing edges of cutting carrier sheets. Thus the cutter blade enters the panel web and is thereafter guided by virtue of abutment with the edges of the carrier sheets. The particular motor control forms no portion of this present invention and any motor control, which in combination with the proximity switch is suitable to drive the cutter blade into the panel web at the appropriate position, can be used.

As will be appreciated, as the cutter is driven across the panel web, the continued motion of the web tends to pull the swing arm 65 about the pivot 67 and away from the carriage 62, but as soon as the cutter blade clears the panel web, the spring 68 is operable to draw the swing arm 65 back into its initial starting position for making its next cutting trasverse across the panel web, and to urge the cutter blade against the stop 71 to position it for the next cut.

Turning now to FIGS. 9 and 9A there is shown an alternate embodiment of a cutting apparatus 60A wherein parts which are similar to the preferred cutting apparatus will be designated by identical numerals together with the suffix "A". In FIG. 9, a motor 61A is controlled by a motor control to drive a carriage 62A across a track 63A transversely to a panel web. FIG. 9 shows the carriage 62A in position on one side of the web in solid lines, and in phantom on the other side of the web subsequent to having made a cut along an intended cut line 81, between the trailing and leading edges of abutting carrier sheets beneath the continuous panel web. This embodiment differs from the preferred embodiment in that the cutter blade 66A is positively mounted to the carriage 62A and does not pivot away therefrom. Accordingly, it is also necessary in the operation of this alternative embodiment to stop the conveyor 25 and the formed panel web at a point, in response to the sensing by proximity switch 23A, so that the cutter blade 66A can be driven through the panel web at the junction of two abutting stopped carrier sheets. Accordingly, a signal from the proximity switch 23A is also delivered to a conveyor control in a suitable fashion for stopping the conveyor 25 at a time when the rivet 22 is sensed and the junction between abutting carriers is aligned with the cutter blade 66A. If necessary, the driving apparatus (not shown) of the conveyor 35 can be braked in order to accurately stop it so that the sensed carrier sheet has a leading edge in appropriate alignment with the cutter 66A. As contrasted to the preferred embodiment, it is necessary to stop the panel web momentarily in this embodiment, together with the panel component feeding features, as will be appreciated, but such stop is of very short duration.

Both the preferred and the alternate cutter embodiments are useful in traversing across the panel web, between abutting carrier sheets, to cut the panel web thus separating individual panels therefrom which are equal in length to that of the carrier sheets thereunder. The cutters as described form a uniform, nonragged panel edge.

From the cutting station, the cut panel is conveyed onto the overspeed conveyor 90, at which point the gap between the cut panel and the following panel web is sensed by, for example, photo electric means 91 of any suitable type. Upon sensing of the trailing edge of the cut panel, indicated by the numeral 1 in FIG. 3B, the pusher 96 is activated to engage the rear end of the panel 1 and push it onto the stacking apparatus 110.

The pusher 96 comprises a pusher dog 97 mounted to a suitable linkage (not shown) which is operable to traverse the pusher dog 97 in the machine direction, whereby pushing a panel 10 onto the stacking apparatus. Upon completion of the pushing motion of the dog 97, the linkage of the pusher mechanism is operable to lift the pusher dog and return it in a direction opposite to the machine direction to the position shown in the phantom lines at 98, where the dog is then in position to lower, move forward, and engage the trailing edge of a succeeding panel.

Thus, it will be appreciated that the overspeed conveyor 90, operating at a speed in excess of that of conveyor 25, is operable to separate the panel 10 from the following continuous panel web. When the passage of panel 10 is sensed on the overspeed conveyor, the pusher dog 97 is operated to lower and to travel in the machine direction to catch up with panel 10 and push it onto the stacker.

The pusher dog 97 is movable in the machine direction to a position shown at 99, which is approximately even with the leading edge 112 of a drop table 113 in the stacking apparatus 110. Since the panels may be of varying lengths, a stop 114 is provided, in association with the stacking apparatus, to limit the movement of the panel on the stacking apparatus in an appropriate position for stacking. Since the extreme movement of the pusher dog is to the position 99 at the leading edge 112 of the drop table 113, it is shown that the leading edge 101 of the panel 10 has not been yet moved to the stop 114; however, it should be appreciated that the momentum of the panel and the coefficient of friction between the plastic carrier sheet 20, and the upper surface of the drop table 113, is such that the assembly comprising the panel 10 and the carrier sheet 20 will slide across the drop table to the position of the adjustable stop 114, thereby properly positioning the panel.

THE PANEL STACKER

The details of the stacking apparatus 110 will now be described. As noted above, the stacking apparatus comprises a drop table 113 which is operable to drop panel assemblies, including a panel and a supporting carrier sheet, onto a stack 111. After curing, the carrier sheets are separated from the panels for re-use in the forming process.

The stack 111 is supported on a pallet 120, which in turn is supported on a vertically movable pallet conveyor 125 operable, as will be described, to convey a stack 111 away from the stacking apparatus 110. The drop table 113 comprises a plurality of drop plates 130 and 131, as best seen in FIG. 10. The drop plates 130 and 131 are mounted to respective racks 132 and 133 and 134 and 135. These racks are driven by respective pinions 136, which are rotated by appropriate drive means (not shown). When the pinions are rotated, the racks are driven transversely to the machine direction to withdraw the drop plates 130 and 131 from beneath the panel 1A and cover sheet 20, thereby dropping the assembly onto the stack 111. As shown in FIG. 10 the drop plates have a unique edge configuration which particularly enhances the integrity of the finished panel product.

It will be appreciated that as the drop plates 130 and 131 are withdrawn, the panel tends to sag in its middle. The sagging or flexing of the panel, particularly in the thicker panels, can cause the layers of the panel to move transversely with respect to each other and thus to separate. This causes a loss of integrity and bonding between the layers and can significantly reduce the strength characteristics of the finished panel. The apparatus and method of the present invention, however, significantly reduces the flexing of the panel in the stacking operation, as will now be described.

Particularly, the drop plates 130 and 131 have tapered edges as shown at 140–143. In drop plates of about seven feet in length in the machine direction, the taper begins at a point about two feet, in the machine direction, from the leading edge 112, and extends rearwardly toward edge 112, and outwardly about four inches. Also, the taper begins at the same point and moves generally in the machine direction and outwardly about four inches at the other end of the plates. The tapering of the edges in this manner, as opposed to simply having straight panel edges parallel to the machine direction, accomplishes a unique result. That is, as the drop plates 130 and 131 are withdrawn from beneath the panel 1A, the central portions of the panel 1A remain supported while the drop plates support is first removed from beneath the corners of the panel. For example, as the drop plates 130 and 131 are withdrawn to the respective positions 130A and 131A, as shown in the phantom lines, it will be noted that the corners of the panel 1A are free to drop and yet the central portion of the panel in the area of the line 1B tends to remain supported by a portion of the drop plates. The dropping first of the corners of the panel 1A, as opposed to dropping the whole panel by removing drop plates having straight edges, tends to reduce the sagging of the panel 1A in the middle, until the last moment. While the corners may slightly flex, that flexing is not to such a great degree as the sagging of the panel could be in the middle, should the edges of the drop plates be parallel and thus be withdrawn from beneath the panel at the same time.

Accordingly, the flexing of the panel is distributed at the lighter corner areas, rather than in the center area, as the drop plates are withdrawn and this, in combination with the relatively quick motion of the drop plates from beneath the panel and the carrier sheet, tends to minimize flexing of the panel, distributing the flex over different greater areas than the center alone and thus enhances the integrity of the finished product. Finally, the drop plates are removed to the positions shown at 130B and 131B whereby the complete panel is permitted to drop onto the stack 111. Of course, the motion of the plates is continuous and rapid.

Several further considerations should here be noted. For example, in FIG. 10, a maximum length panel is shown engaging the stops 114 so that the line 1B is not in the direct center of the panel 1A. When shorter panels are utilized, however, the tapering of the drop plates 130 and 131, as shown, are more centrally localized beneath the shorter panels, this by virtue of the moving of the stops 114 in the opposite direction of the machine direction in order to accommodate the shorter panels. In any event, the tapering of the drop plates 130 and 131 as above described serves to significantly reduce panel flex for all size panels, for example, those of 3, 4 or even 6 to 7 feet in length, and in each case serve to support the center area of the panel until the last moment, thereby reducing flex. Thus, while the panels flex somewhat, the tapering of the drop plates 130 and 131 significantly minimizes this flex so as to reduce or eliminate layer separation.

The stacking apparatus also includes a stack support for raising and the lowering of the stack, as will not be described. More particularly, minimization of the dropping distance of the panel is important in order to ensure uniform edges and less panel flex. Accordingly, it is desired to drop each panel through only as short a distance as possible. Accordingly, the conveyor 125 is mounted on a scissors linkage 150, connected to an appropriate hydraulic cylinder 151. When pressurized, the cylinder 151 serves to extend the linkage and thus to raise the conveyor 12t toward the drop table 113. On the other hand, when the cylinder is vented, it permits the scissors linkage 150 to compress, thereby lowering the conveyor 125 and the stack 111 from the drop table.

In the preferred method, it is desired to drop the panel on the drop table the shortest distance. Thus the cylinder 151 is controlled to raise the stack 111 to just immediately underneath the drop table 113 for each panel which is to be dropped. To this end, the stacking apparatus is provided with the photo electric sensing apparatus 155 positioned across the stack 111, as shown in FIGS. 3B and 112. The photo sensing apparatus is connected to an electrical hydraulic cylinder control of any suitable type.

As the pusher dog 97 traverses to its end position 99 (FIG. 3B), a limit switch LS-1 is engaged and signals a suitable drop plate control to actuate the pinion driving mechanism (not shown) to open the drop plates. This occurs after a predetermined delay to ensure that the panel is in the appropriate position on the drop table, against the stops. As the drop plate control operates the drop plate, it also is operable to signal a cylinder control which causes the cylinder to vent, permitting the scissors linkage 150 to relax and the stack 111 to thereby lower, also, after a predetermined delay to permit the panel 1A to fall on the top of the stack before lowering of the stack. As the cylinder 151 is vented, the stack 111 continues to lower and falls beneath the photo sensing apparatus 155. A beam is made across the top of the stack and, upon making the beam, the photo sensor signals the cylinder control which pressurizes the cylinder. Pressurization of the cylinder 151 extends the scissors linkage 150, thereby raising the stack 111 until such time as the beam of the photo sensing apparatus 155 across the stack 111 is broken. At this point, the photo sensor again signals the cylinder control, which is operable to stop the cylinder in static condition and maintain the stack 111 in a raised position. The positioning of the photo sensing apparatus 155 is thus important to minimizing the drop distance. It is positioned as high as possible so that the uppermost panel on the stack 111 is as close as possible to the underneath surface of the drop plates 130 and 131. In this manner, the stack 111 is raised to the highest possible position so that the uppermost panel on the stack is in the same position relative to the drop plates as was the immediately underneath panel when the uppermost panel was dropped. Accordingly, the stacking apparatus is then in condition to receive another panel which is dropped only a short distance, preferably just greater than that of the thickness of the drop plates.

Accordingly, the combination of the configuration of the drop plates, together with the functional features of the stacking apparatus whereby the drop distance is minimized, acts to substantially reduce flexing and disturbance of the uncured panel throughout the dropping operation.

As the stack 111 grows by virtue of succeedingly dropped panels, the scissors mechanism is eventually lowered to a point where the conveyor apparatus tends to rest on off center stops 160 and 161. While the scissors linkage has been described as a single unit for clarity, as shown in FIG. 11, two scissors linkages 150A and 150B, together with appropriate cylinders, are provided. The scissors linkages operate simultaneously, until such time as the stops 160 and 161 are engaged. At this point, and during venting of the cylinders 151A and 151B, the scissors linkages are relaxed. By virtue of the fact that the stops 160 and 161 are off center, as shown in FIG. 11, however, the lefthand end of the conveyor 125, as viewed in FIG. 11, is permitted to drop below the righthand end, thus forming an incline, and the stack 111 on its pallet 120 tends to roll down the conveyor 125 onto a takeoff conveyor 126 for movement to a further curing and storage area.

While several control functions have been described and illustrated, for example in FIG. 12, it should be noted that any suitable mechanisms and controls as as well known can be utilized to accomplish these new functions as described, and the particular mechanisms form on part of this invention.

Having now described the invention in detail, further advantages and modifications which can be made without departing from the scope of the invention will be appreciated by those of ordinary skill in the art, and the applicant intends to be bound only by the claims appended hereto.

I claim:

1. Apparatus for manufacturing cementitious panels of the type having a nailable cementitious aggregate core faced on each major side with a reinforcing element bathed in a slurry comprising hydraulic cement, said apparatus comprising:
   - a conveyor means for conveying a plurality of flat, abutting carrier sheets;
   - a slurry trough containing a slurry bath comprising hydraulic cement;
   - means for running a first reinforcing web through said trough and for metering the amount of slurry adhering to said first web;
   - a drag bar means engaging an upper side of said first web for pushing said slurry through said first web, and said slurried web onto moving carrier sheets on said conveyor;
   - means for depositing a metered amount of a nailable aggregate cementitious core material onto said slurried web;
   - means for compacting said core material;
   - a second slurry trough containing a slurry bath comprising hydraulic cement;
   - means for running a second reinforcing web through said trough and for metering the amount of slurry adhering to said first web;
   - second drag bar means engaging an upper side of said second web for pushing said slurry through said second web, and said second slurried web onto said aggregate core material, said second web adhering thereto, and thereby forming an elongated uncured panel web;
   - means for transversely cutting separate panels from said uncured panel web between adjacent carrier sheets; and
   - means for stacking said separate panels for curing.

2. Apparatus as in claim 1 further including a second conveyor means downstream of said cutting means for conveying cut panels away from said panel web toward said stacking means.

3. Apparatus as in claim 2 including means for pushing cut panels onto said stacking means.

4. Apparatus as in claim 1 wherein said stacking means comprises a drop table having a pair of drop plates slidable from beneath a carrier sheet and a cut panel thereon to drop said sheet and panel thereneath onto a panel stack.

* * * * *